US006594559B2

(12) United States Patent
Alwin et al.

(10) Patent No.: US 6,594,559 B2
(45) Date of Patent: Jul. 15, 2003

(54) ITERATIVE METHOD OF AIRCRAFT SIDESLIP COMPENSATION FOR MULTI-FUNCTION PROBE AIR DATA SYSTEMS

(75) Inventors: Steve F. Alwin, St. Paul, MN (US); Dennis J. Cronin, Apple Valley, MN (US); Roger D. Foster, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 48 days.

(21) Appl. No.: 09/851,485

(22) Filed: May 8, 2001

(65) Prior Publication Data

US 2002/0169526 A1 Nov. 14, 2002

(51) Int. Cl.$^7$ .............................................. G01C 21/00
(52) U.S. Cl. .............................. 701/14; 701/6; 701/7; 73/178 R; 73/180
(58) Field of Search ......................... 701/1, 6, 7, 14; 73/178 R, 180, 189, 182, 183

(56) References Cited

U.S. PATENT DOCUMENTS

| | | | |
|---|---|---|---|
| 3,318,146 A | 5/1967 | DeLeo et al. | |
| 4,096,744 A | 6/1978 | DeLeo et al. | 73/180 |
| 4,378,696 A | 4/1983 | DeLeo et al. | 73/180 |
| 4,378,697 A | 4/1983 | DeLeo et al. | 73/182 |
| 5,205,169 A | 4/1993 | Hagen | 73/180 |
| 5,319,970 A | 6/1994 | Peterson et al. | 73/182 |
| 5,369,993 A | * 12/1994 | Hagan | 73/178 R |
| 5,485,412 A | 1/1996 | Sarkkinen et al. | 364/724.05 |

OTHER PUBLICATIONS

"BFGoodrich—Aircraft Sensors Division Air Data System with SmartProbe for Fairchiled Dornier 728JET", BFGoodrich—Rosemount Aerospace, Addendum to D9820217 Rev. B, Oct. 1998, pp. 1–10.
"SmartProbe™ Air Data System for Embraer ERJ–170 & 190", BFGoodrich—Aircraft Sensors Division, Proposal D9920133, Apr. 1999, pp. 1–65.
F.W. Hagen and Dr. H. Seidel, "Deutsche Airbus Flight Test of Rosemount Smart Probe for Distributed Air Data System", IEEE AES Systems Magazine, Apr. 1994, pp 7–14.
Bulletin 1013, "Pitot and Pitot–Static Probes", BFGoodrich (May 1998).
T.J. Rohloff, S.A. Whitmore and I. Catton, "Air Data Sensing from Surface Pressure Measurements Using a Neural Network Method", AIAA Journal, Vo. 36, No. 11, Nov. 1998, pp. 2095–2101.
T.J. Rohloff, S.A. Whitmore and I. Catton, "Fault–Tolerant Neural Network Algorithm for Flush Air Data Sensing", Journal of Aircraft, vol. 36, No. 3, May–Jun. 1999, pp. 541–549.
T.J. Rohloff and I. Catton, "Fault Tolerance and Extrapolation Stability of a Neural Network Air–Data Estimator", Journal of Aircraft, vol. 36, No. 3, May–Jun. 1999, pp. 571–576.

* cited by examiner

Primary Examiner—Thomas G. Black
Assistant Examiner—Arthur D. Donnelly
(74) Attorney, Agent, or Firm—Westman, Champlin & Kelly, P.A.

(57) ABSTRACT

In an iterative method of determining aircraft flight data parameters using first and second multi-function probes, an assumed value of a first aircraft parameter is defined to be equal to an initial value. Using the assumed value of the first aircraft parameter together with the respective local angles of attack determined at first and second multi-function probes, first and second estimates of a second aircraft parameter are calculated and compared. If the first and second estimates of the second aircraft parameter are within tolerance of each other, then the first aircraft parameter is approximately equal to the assumed value, and the second aircraft parameter is determined from the first and second estimates. If the first and second estimates of the second aircraft parameter are not within tolerance of each other, then an iterative process is continued to correctly determine the first and second parameters.

18 Claims, 4 Drawing Sheets

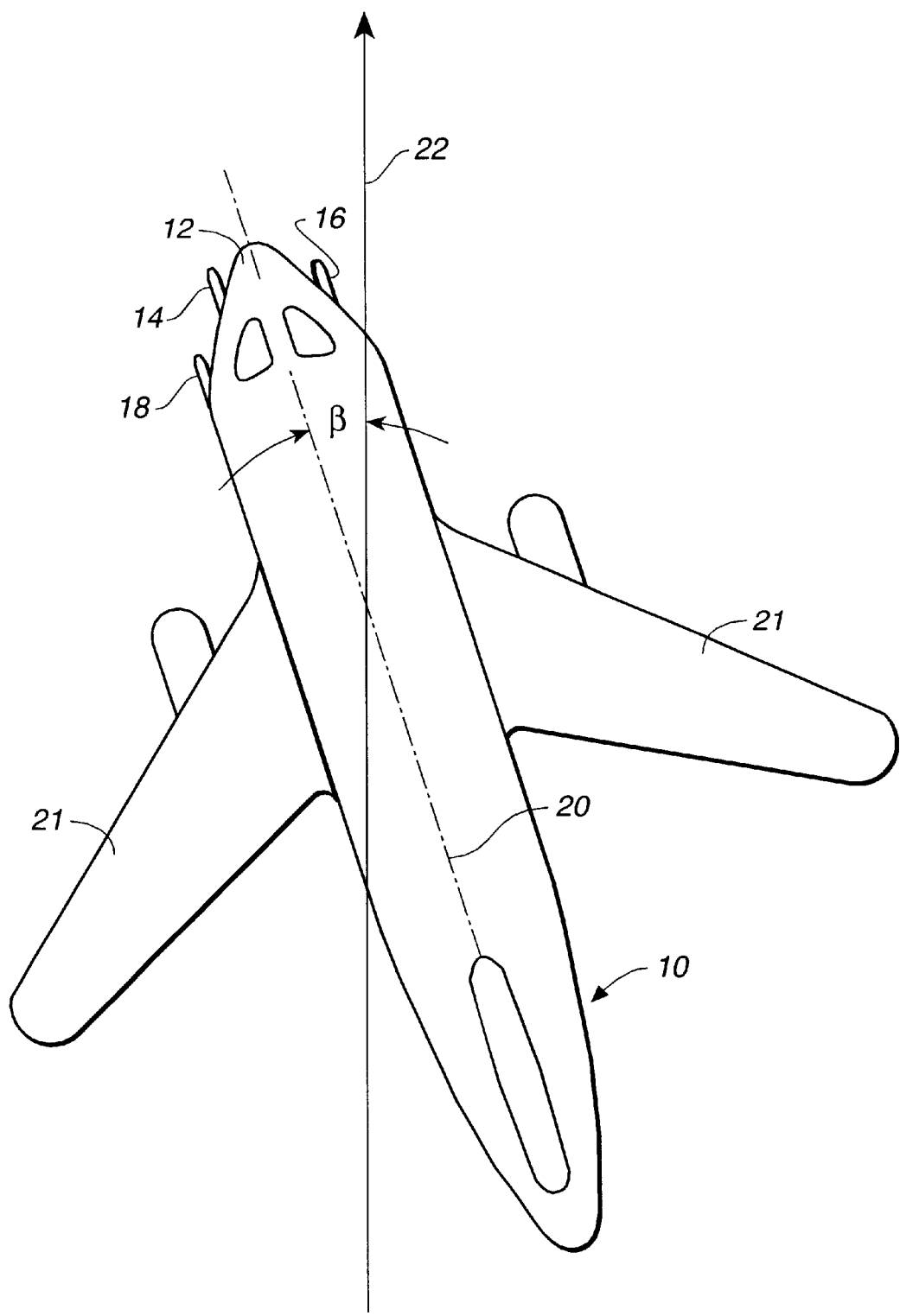
FIG._1

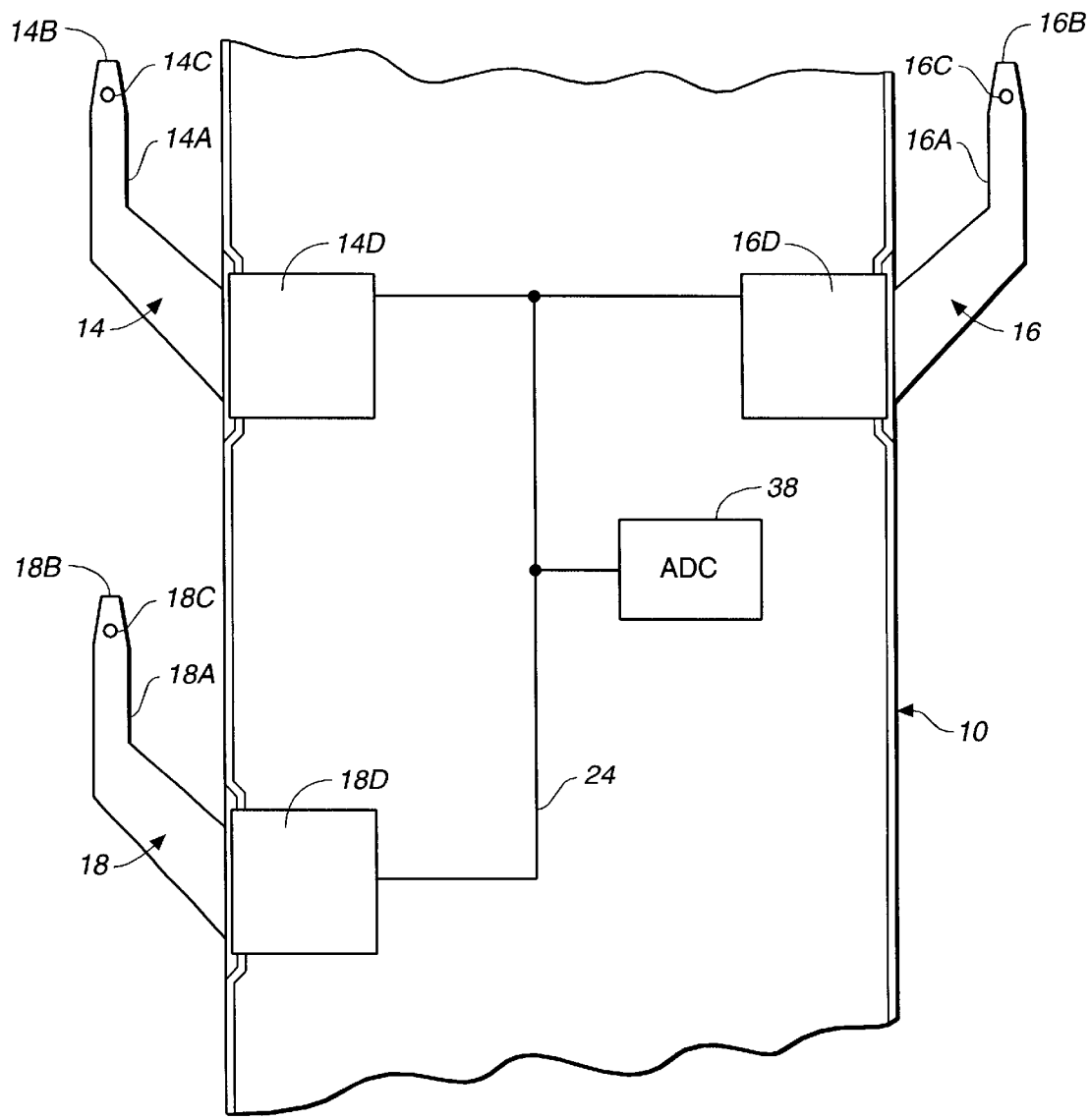
FIG._2

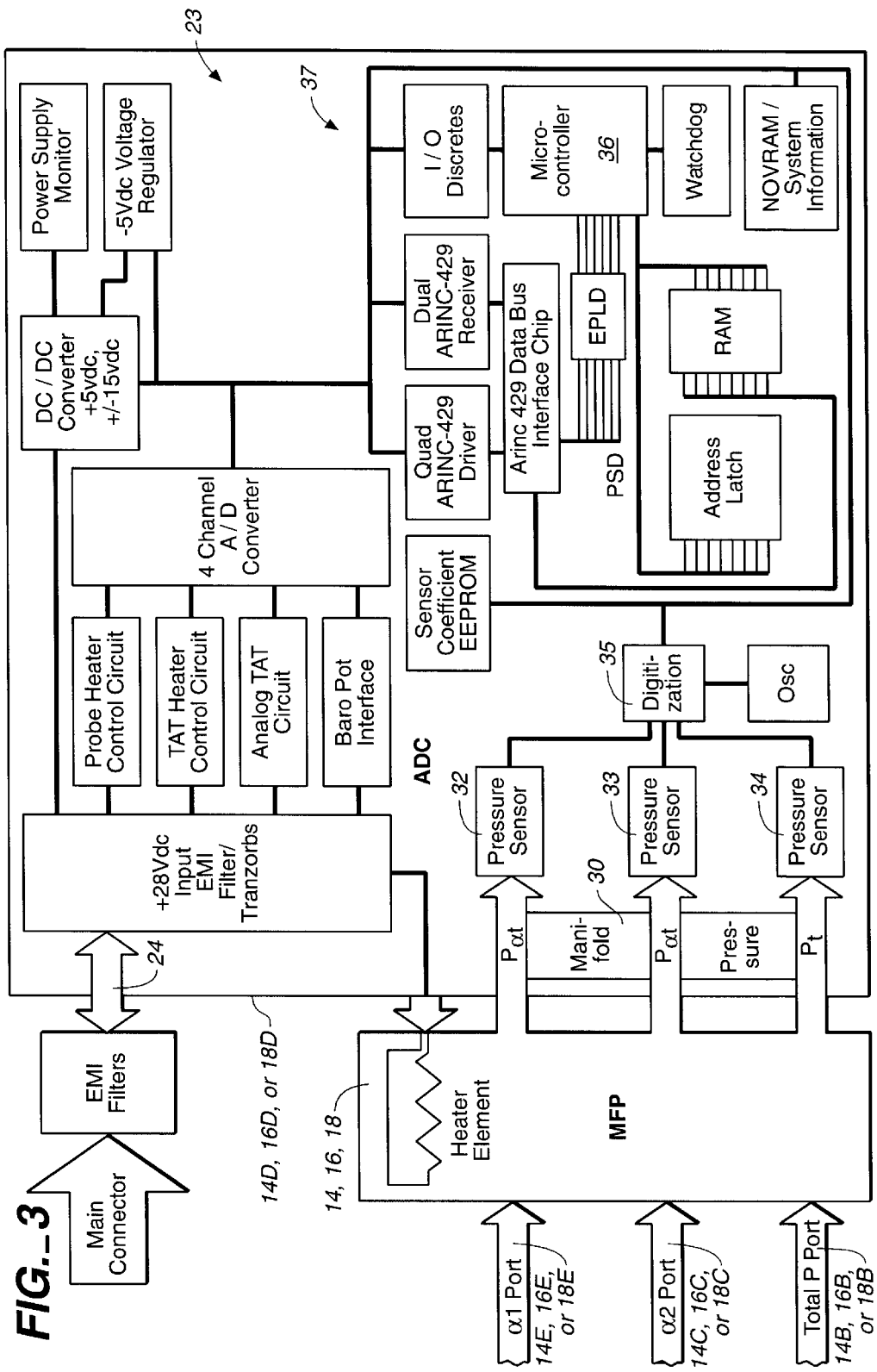
FIG._3

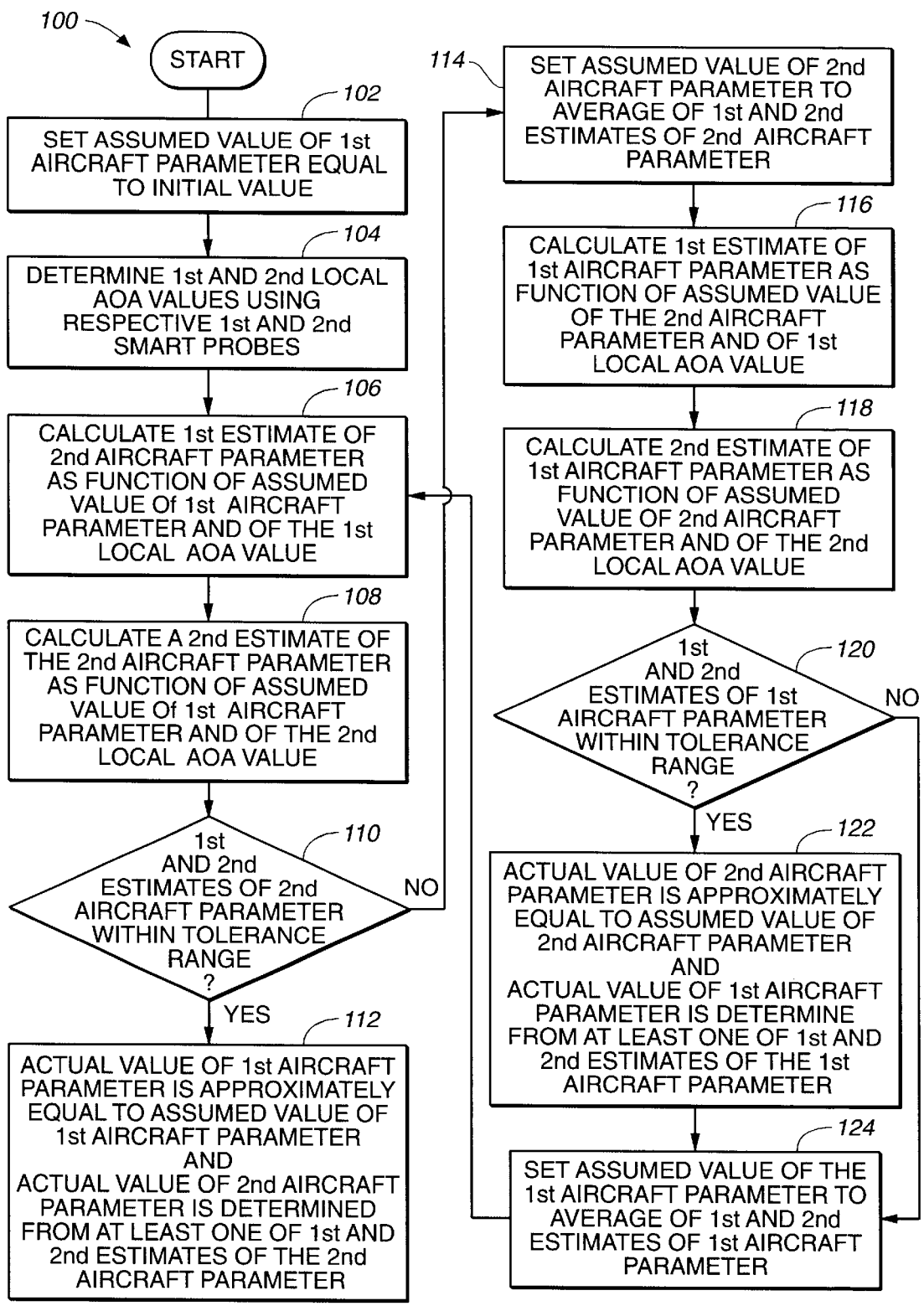
FIG._4

ITERATIVE METHOD OF AIRCRAFT SIDESLIP COMPENSATION FOR MULTI-FUNCTION PROBE AIR DATA SYSTEMS

CROSS-REFERENCE TO RELATED APPLICATION

Cross reference is made to U.S. application Ser. No. 09/851,289, entitled "MULTI-FUNCTION AIR DATA PROBES USING NEURAL NETWORK FOR SIDESLIP COMPENSATION," filed May 8, 2001 U.S. application Ser. No. 09/850,863, entitled "METHOD TO CALCULATE SIDESLIP ANGLE AND CORRECT STATIC PRESSURE FOR SIDESLIP EFFECTS USING INERTIAL INFORMATION," filed May 8, 2001 and U.S. application Ser. No. 09/850,769, entitled "SIDESLIP CORRECTION FOR A MULTI-FUNCTION THREE PROBE AIR DATA SYSTEM," filed on May 8, 2001.

BACKGROUND OF THE INVENTION

The present invention relates to air data systems that provide accurate compensation of sideslip of an air vehicle utilizing independent probes that are not pneumatically coupled, but which have processors for interchanging electrical signals between the probes. These probes are sometimes referred to as multi-function probes (MFPs). One type of MFP is the SmartProbe™ sold by B. F. Goodrich Company. Multi-function probes include processing circuitry located at the probe itself as part of its instrument package. During sideslip of the air vehicle, compensation of various local (to the probes) parameters or signals, such as angle of attack and static pressure, is necessary for accurate determination of aircraft angle of attack and other aircraft parameters including determination of altitude from static pressure or other means. This requirement for accuracy in altitude indications is particularly important in Reduced Vertical Separation Minimum (RVSM) space areas of the air traffic control system.

In conventional air data systems, probes on opposite sides of an aircraft can be pneumatically connected so that the pressure signals are averaged between the right side of the aircraft and the left side of the aircraft to provide a static pressure that is "nearly true". In most conventional systems, although corrections are made for Mach number and aircraft angle of attack, it is rare that neglecting sideslip effect will introduce enough error to warrant a correction based on sideslip for the cross coupled probes.

However, MFPs are connected only electrically in order to eliminate the need for pneumatic tubing passing between the opposite sides of the aircraft or between probes on the same side of the aircraft. This means that each probe is pneumatically independent, even if it is electrically communicating with other probes. In the RVSM space, there is a need for dual redundant systems for static pressure estimation. While information can easily be exchanged between the processing circuitry of different probes, the need for determining sideslip effects remains. Computational fluid dynamic analysis has shown that position errors can be up to 600 feet per degree of sideslip under typical RVSM flight conditions at, for example, 41,000 feet and a Mach number of 0.8. It is thus apparent that the sideslip effect must be corrected to obtain the necessary accuracy for certification by aviation authorities.

SUMMARY OF THE INVENTION

The present invention relates to multi-function air data sensing systems which provide for redundancy in correcting for sideslip of an aircraft arriving at various air data parameters, such as aircraft angle of attack, pressure altitude, and Mach number. Aerodynamic sideslip is a measure of the magnitude of a cross component of airspeed to the forward component of airspeed. Compensation information exchanged between MFPs, such as a differential and local angle of attack between the two sides of an aircraft, can provide an indication of sideslip effect utilizing the system disclosed herein. Using values of local angle of attack, for example at two separate MFPs, provides information that corresponds to aircraft parameters or variables of angle of attack and angle of sideslip.

A predictor-corrector method can be used to iteratively calculate aircraft parameters based on assumed free stream variables. As an example, knowing the local angle of attack at a single probe, a prediction is made for the aircraft angle of attack based on an assumed value of aircraft angle of sideslip. This is done for a second probe on the same aircraft. A comparison is made between the two predicted values of aircraft angle of attack. If they differ within a selected tolerance, it is deduced that the assumed aircraft angle of attack and aircraft angle of sideslip are correct for that combination of local angle of attack measurements at the two MFPs. If the difference between the two predicted aircraft angles of attack is not within a specified tolerance, it is assumed that the aircraft angle of attack is actually the average of the two predictions. Predictions for aircraft angle of sideslip are then made, with each prediction being made using the local angle of attack from a different one of the two probes and the new assumed aircraft angle of attack. A comparison is then made between the two predicted aircraft angle of sideslip values. If the two predicted aircraft angle of sideslip values are within a predetermined tolerance range of each other, then the iterative process is completed and the aircraft parameters of angle of sideslip and angle of attack are determined based upon the predictions and assumptions. If the two predicted aircraft angle of sideslip values are not within tolerance, the process continues.

BRIEF DESCRIPTION OF THE DRAWINGS

FIG. 1 is a top plan view of an aircraft illustrating a sideslip condition.

FIG. 2 is a schematic representation of a cross section of a nose portion of an aircraft showing placement of air data sensing probes called multi-function probes (MFPs) made and configured to function in accordance with the present invention in one form.

FIG. 3 is a block diagram illustrating circuitry of one or more of the smart probes, with the circuitry including an air data computer in some embodiments of the invention.

FIG. 4 is a flow diagram illustrating an iterative method of aircraft sideslip compensation in accordance with embodiments of the invention.

DETAILED DESCRIPTION OF THE PREFERRED EMBODIMENTS

Referring to FIG. 1, an aircraft indicated generally at 10 is shown with a nose portion 12. Mounted air data sensing probes are indicated schematically and generally at 14, 16 and 18. The positioning of aircraft 10 is with respect to a center plane or center line 20 that is perpendicular to the normal plane of the wings 21. Center line 20 is shown in a greatly exaggerated sideslip condition where the path of travel of aircraft 10 is indicated at 22, and where there is a substantial angle $\beta$ between the path of travel line 22 and the line or plane 20. Angle $\beta$ is the aircraft angle of sideslip, which is defined herein as an aircraft parameter. The aircraft essentially is yawing to the left in FIG. 1. As the airflow passes across the aircraft, the probes 14 and 18 will be subjected to different flow conditions, insofar as the angle of wind and local static pressure is concerned, than is the probe 16.

Another aircraft parameter is aircraft angle of attack. It also can be envisioned that if the aircraft changes angle of attack, because of the yaw angle, the amount of change in pressure on one side of the aircraft would be different than that on the other side of the aircraft. When the probes are only electrically connected together, it is difficult to average these changes to obtain a correct static pressure reading. The angle of sideslip value can be used as a correction factor to compensate for this angle.

A multi-function probe or MFP is defined as a probe in which a computer is integrally attached as a processor to the probe, and the sensing portions of the probe itself protrude in the airstream that moves past the aircraft skin. The processor is an integrated housing immediately inside the skin. The outputs from MFPs are digital electrical signals representing pressures derived from sampling the pressure readings from internal pressure sensors. The internal pressure sensors of an MFP can be either differential sensors or absolute sensors that receive the pressure signals and convert them into electrical signals that are then digitized. In some embodiments of the invention, the methods disclosed herein are implemented within an air data computer (ADC) embodied in the processing circuitry integral to the MFP housing, or within multiple ADCs located within multiple MFPs. In yet other embodiments, the methods are implemented within an ADC which is coupled to, but located remote from, the MFP.

The probes 14, 16 and 18 may be probes such as that shown in the U.S. Pat. No. 4,378,696, or other similar patents. As shown schematically in FIG. 2, the probes have barrels 14A, 16A and 18A, with suitable ports for sensing pitot pressure at leading ends of the probes indicated at 14B, 16B and 18B. The angle of attack sensing ports are placed on the top and bottom of the probes, and the top ports are illustrated schematically at 14C, 16C and 18C. Mating ports are on the lower portion, as is well known, for measuring the angle of attack by sensing the differentials in pressure between the upper port and the lower port. The lower port on the probes will sense a pressure designated $P\alpha_1$, and the upper ports shown at 14C, 16C and 18C sense a pressure designated $P\alpha_2$. Each of the probes 14, 16 and 18 is provided with separate instrument housing 14D, 16D and 18D, respectively. While MFPs 14, 16 and 18 are shown in FIGS. 1 and 2, the present invention can, in some embodiments, only include two MFPs such as probes 14 and 16 or other combinations such as probes 16 and 18. The following examples are discussed primarily with reference to two MFPs.

As shown in FIG. 2, the electronics within instrument housings 14D, 16D and 18D are electrically coupled via electrical connection 24. Electrical connection 24 can be a data bus, electrical cables, or other types of communication pathways for communicating information. Also shown in FIG. 2 is an optional remote ADC 38 within which the methods of the present invention can be implemented. However, in embodiments of the invention, the iterative methods disclosed herein are implemented within one or more ADCs contained within the housings 14D, 16D and/or 18D associated with the MFPs. In these embodiments, optional ADC 38 can be omitted if desired.

The arrangement of the circuitry in one example embodiment of an MFP is shown in block diagram form in FIG. 3.

Multi-function probe circuitry 23 is shown schematically coupled to a probe (14, 16 or 18) which is labeled as a multi-function probe (MFP). Circuitry 23 is positioned within the corresponding housing 14D, 16D and 18D, and in the illustrated embodiment comprises an air data computer (ADC). Inputs are illustrated schematically as the $\alpha_1$ pressure port 14E, 16E or 18E, $\alpha_2$ pressure port 14C, 16C or 18C, and the total pressure port 14B, 16B or 18B. The $\alpha_2$ pressure port and total pressure port correspond to those shown in FIG. 2 for probes 14, 16 and 18. The $\alpha_1$ pressure port corresponds to the lower port (not shown in FIG. 2) on the probes.

These pressures are transmitted through a manifold 30 to individual pressure sensors 32, 33 and 34, respectively. The outputs of pressure sensors 32, 33 and 34 are provided to analog-to-digital converter 35 for digitization. Processing and communications circuitry 37 includes a microcontroller 36 and related memory and communications circuits all forming part of the ADC (i.e., circuitry 23). The ADC can also include other circuits and devices such as electromagnetic filters for reducing EMI interference, heater control circuits, and power supplies. Air data computer or circuitry 23 also includes and/or is coupled to data bus 24 for receiving information from, or transmitting information to, other MFPs in the system. The methods of the present invention can be implemented within the air data computers of one or more MFPs, or can be implemented in a separate and remotely positioned air data computer.

FIG. 4 is a flow diagram illustrating iterative methods of determining aircraft flight data parameters using first and second MFPs. For example, the iterative method illustrated in FIG. 4 can be implemented using data from MFPs 14 and 16 or any other appropriate combination of two MFPs shown in FIG. 1. The calculations of the iterative method steps can be implemented in the ADC or processing circuitry of either or both MFPs, or in a separate ADC. In the following discussion, aircraft parameters such as aircraft angle of sideslip and aircraft angle of attack are defined as the angle of sideslip and angle of attack, respectively, for the aircraft itself. For example, FIG. 1 illustrates aircraft angle of sideslip β. A local angle of attack, on the other hand, is defined as the angle of attack as measured or perceived by an individual MFP based upon pressures sensed using that MFP. The local angle of attack can also be defined as the compensated angle of attack measured by an individual MFP, and compensated by that MFP for a local sideslip value also measured at that probe. The local angle of attack values can also be defined to include values compensated in other manners.

Using values of local angle of attack, for example, provided by two separate MFPs, there exists some unique combination of probe angles that correspond to aircraft variables of angle of attack and angle of sideslip. A predictor-corrector method can be used to iterate on aircraft parameters based on assumed freestream variables. The assumed freestream variables can be an assumed value of a first aircraft parameter such as aircraft angle of attack or aircraft angle of sideslip. An example of this iterative method is illustrated in FIG. 4.

As shown in step 102 in flow diagram 100 of FIG. 4, the iterative method begins by setting or defining an assumed value of a first aircraft parameter to be equal to an initial value. For purposes of providing an example, it is assumed in the following discussion that the first aircraft parameter is an aircraft angle of sideslip. However, the first aircraft parameter could also be, for example, an aircraft angle of attack. In the present example where the first aircraft parameter is an aircraft angle of sideslip, the assumed value of the aircraft angle of sideslip is defined to be equal to an initial value. The initial value can be, for example, zero or a last previously known actual value of the aircraft angle of sideslip.

Next, at step 104, first and second local angle of attack values are determined, using respectively the first and second MFPs (for example probes 14 and 16 in FIG. 1). Next, as illustrated in step 106 and 108, first and second estimates of a second aircraft parameter (aircraft angle of attack in the present example) are calculated. The first estimate of the second aircraft parameter is calculated as a function of the assumed value of the first aircraft parameter and of the first local angle of attack value. Likewise, the second estimate of the second aircraft parameter is calculated as a function of the assumed value of the first aircraft parameter and of the second local angle of attack value. In general, the relationship between the local angle of attack and a single aircraft parameter, such as an assumed aircraft angle of sideslip, will uniquely determine the other aircraft level parameter for a local angle of attack measured at a single location. Methods of estimating aircraft angle of attack for a particular local angle of attack and a particular aircraft angle of sideslip are known in the art.

At step 110 illustrated in FIG. 4, the first and second estimates of the second aircraft parameter are compared to determine whether they are within a predetermined tolerance range of each other. If the first and second estimates of the second aircraft parameter are determined to be within the predetermined tolerance range of each other, then the actual value of the first aircraft parameter is determined to be approximately equal to its assumed value, and the actual value of the second aircraft parameter is determined from at least one of the first and second estimates of this second aircraft parameter. This is illustrated in FIG. 4 at step 112. Determining the actual value of the second aircraft parameter from at least one of the first and second estimates of the second aircraft parameter can be accomplished using any desired method since the estimates are reasonably close to one another. For example, the actual value of the second aircraft parameter can be determined as an average of the first and second estimates of the second aircraft parameter, or by selecting one of the first and second estimates of the second aircraft parameter.

If it is determined that the first and second estimates of the second aircraft parameter are not within the predetermined tolerance range of each other, then the method continues at step 114. At step 114, an assumed value of the second aircraft parameter (aircraft angle of attack in this example) is defined to be an average of the first and second estimates of this second aircraft parameter (determined in steps 106 and 108 discussed above). In steps 116 and 118, first and second estimates of the first aircraft parameter (aircraft angle of sideslip in the example) are calculated. In step 116, the first estimate of the first aircraft parameter is calculated as a function of the newly assumed value of the second aircraft parameter and of the first local angle of attack value determined at step 104 as discussed above. In step 118, the second estimate of the first aircraft parameter is calculated as a function of the newly assumed value of the second aircraft parameter and of the second local angle of attack value also determined at step 104.

At step 120 illustrated in FIG. 4, the first and second estimates of the first aircraft parameter are compared to determine whether they are within a predetermined tolerance range of each other. As shown at step 122, if the first and second estimates of the first aircraft parameter are determined to be within the predetermined tolerance range of each other, then the actual value of the second aircraft parameter is determined to be approximately equal to the assumed value of the second aircraft parameter. The actual value of the first aircraft parameter is then determined from at least one of the first and second estimates of the first aircraft parameter. Similar to the case in step 112 discussed above, in step 122 the actual value of the first aircraft parameter can be determined from an average of the first and second estimates of the first aircraft parameter, or by selecting one of the first and second estimates of the first aircraft parameter, for example. As illustrated at step 124 in FIG. 4, if the first and second estimates of the first aircraft parameter are determined to not be within the predetermined tolerance range of each other, then the assumed value of the first aircraft parameter is changed from its initial value (and most recent value in subsequent iterations) (defined in step 102) to an average of the first and second estimates of the first aircraft parameter (identified in steps 116 and 118). At this point, the method returns to steps 106 and 108 and the first and second estimates of the second aircraft parameter are again calculated, this time using the new assumed value of the first aircraft parameter. The method iterates until the first and second estimates of the first aircraft parameter, or the first and second estimates of the second aircraft parameter, are within a tolerance range of each other.

The method described above generically with reference to first and second aircraft parameters can be described more specifically with reference to this example in which the first aircraft parameter is an aircraft angle of sideslip and the second aircraft parameter is an aircraft angle of attack. Knowing the local angle of attack at a single MFP, a prediction is made for the aircraft angle of attack based on an assumed value of the aircraft angle of sideslip. This is repeated for a second probe measurement of the local angle of attack. A comparison is made between the two predicted values of the aircraft angle of attack. If they differ within a tolerance, it is deduced that the assumed aircraft angle of sideslip is correct, and that the first and second estimates of the aircraft angle of attack are accurate. The aircraft angle of attack is then determined from at least one of the first and second aircraft angle of attack estimates. If the difference between the aircraft angle of attack estimates is not within the tolerance, it is assumed that the aircraft angle of attack is actually equal to the average of the two predictions. Using this new aircraft angle of attack assumption, aircraft angle of sideslip predictions are then made, each as a function of the assumed value of the aircraft angle of attack and a different one of the local angles of attack measured at the two MFPs. A comparison is made between the two predicted aircraft angle of sideslips to determine whether they are within a predetermined tolerance range, and if necessary the method continuous iteratively in this manner.

Although the present invention has been described with reference to preferred embodiments, workers skilled in the art will recognize that changes may be made in form and detail without departing from the spirit and scope of the invention. For example, the first and second aircraft parameters described above can be defined as aircraft angle of sideslip and aircraft angle of attack, respectively, or vice versa. In the alternative, one or both of the first and second aircraft parameters can be defined to be still other aircraft parameters. Also, the iterative method of the present invention can be applied to a combination of non-pneumatically connected Pitot-static probes that has input from a local angle of attack source. Further, the present invention can also be applied using local pressures rather than local angle of attack information. For example, the method could start with an assumed aircraft angle of attack and an assumed aircraft Mach number, and iterate to eventually find an aircraft angle of sideslip. These and other embodiments of the disclosed method are within the scope of the invention.

What is claimed is:

1. A method of determining aircraft flight data parameters using first and second multi-function probes, the method comprising:

(A) defining an assumed value of a first aircraft parameter to be equal to an initial value;

(B) determining a first local angle of attack value using the first multi-function probe;

(C) determining a second local angle of attack value using the second multi-function probe;

(D) calculating a first estimate of a second aircraft parameter as a function of the assumed value of the first aircraft parameter and of the first local angle of attack value;

(E) calculating a second estimate of the second aircraft parameter as a function of the assumed value of the first aircraft parameter and of the second local angle of attack value;

(F) comparing the first and second estimates of the second aircraft parameter to determine whether they are within a predetermined tolerance range of each other; and (G) if the first and second estimates of the second aircraft parameter are determined to be within the predetermined tolerance range of each other, then determining an actual value of the first aircraft parameter to be approximately equal to the assumed value of the first aircraft parameter, and determining an actual value of the second aircraft parameter from at least one of the first and second estimates of the second aircraft parameter.

2. The method of claim 1, wherein the first aircraft parameter is an aircraft angle of sideslip, and wherein the second aircraft parameter is an aircraft angle of attack.

3. The method of claim 1, wherein the first aircraft parameter is an aircraft angle of attack, and wherein the second aircraft parameter is an aircraft angle of sideslip.

4. The method of claim 1, wherein determining the actual value of the second aircraft parameter in step (G) further comprises determining the actual value of the second aircraft parameter as an average of the first and second estimates of the second aircraft parameter.

5. The method of claim 1, wherein determining the actual value of the second aircraft parameter in step (G) further comprises determining the actual value of the second aircraft parameter by selecting one of the first and second estimates of the second aircraft parameter.

6. The method of claim 1, wherein the initial value of the assumed value of the first aircraft parameter is equal to zero.

7. The method of claim 1, wherein the initial value of the assumed value of the first aircraft parameter is equal to a last previously known actual value of the first aircraft parameter.

8. The method of claim 1, and if the first and second estimates of the second aircraft parameter are determined to not be within the predetermined tolerance range of each other, then further comprising:

(H) defining an assumed value of the second aircraft parameter to be an average of the first and second estimates of the second aircraft parameter;

(I) calculating a first estimate of the first aircraft parameter as a function of the assumed value of the second aircraft parameter and of the first local angle of attack value;

(J) calculating a second estimate of the first aircraft parameter as a function of the assumed value of the second aircraft parameter and of the second local angle of attack value;

(K) comparing the first and second estimates of the first aircraft parameter to determine whether they are within a predetermined tolerance range of each other; and (L) if the first and second estimates of the first aircraft parameter are determined to be within the predetermined tolerance range of each other, then determining the actual value of the second aircraft parameter to be approximately equal to the assumed value of the second aircraft parameter, and determining the actual value of the first aircraft parameter from at least one of the first and second estimates of the first aircraft parameter.

9. The method of claim 8, wherein determining the actual value of the first aircraft parameter in step (L) further comprises determining the actual value of the first aircraft parameter as an average of the first and second estimates of the first aircraft parameter.

10. The method of claim 8, wherein determining the actual value of the first aircraft parameter in step (L) further comprises determining the actual value of the first aircraft parameter by selecting one of the first and second estimates of the first aircraft parameter.

11. The method of claim 8, and if the first and second estimates of the first aircraft parameter are determined to not be within the predetermined tolerance range of each other, then further comprising:

(M) defining the assumed value of the first aircraft parameter to be an average of the first and second estimates of the first aircraft parameter; and (N) repeating steps (D) through (G) of claim 1 using the new assumed value of the first aircraft parameter.

12. The method of claim 11, and if the new first and second estimates of the second aircraft parameter are determined not to be within the predetermined tolerance range of each other, then repeating steps (H) through (L) of claim 8.

13. An air data system for determining first and second air data parameters for an aircraft, the air data system comprising:

a first multi-function probe configured to determine a first local angle of attack;

a second multi-function probe configured to determine a second local angle of attack; and an air data computer coupled to the first and second multi-function probes and configured to iteratively determine the first and second air data parameters for the aircraft using an assumed value of the first air data parameter and the first and second local angles of attack.

14. The air data system of claim 13, wherein the air data computer is integral with one of the first and second multi-function probes.

15. The air data system of claim 13, wherein the first and second air data parameters for the aircraft include an aircraft angle of sideslip and an aircraft angle of attack.

16. The air data system of claim 13, wherein the air data computer is configured to iteratively determine the first and second air data parameters for the aircraft by performing the steps of:

(A) defining the assumed value of the first aircraft parameter to be equal to an initial value;

(B) calculating a first estimate of the second aircraft parameter as a function of the assumed value of the first aircraft parameter and of the first local angle of attack value;

(C) calculating a second estimate of the second aircraft parameter as a function of the assumed value of the first aircraft parameter and of the second local angle of attack value;

(D) comparing the first and second estimates of the second aircraft parameter to determine whether they are within a predetermined tolerance range of each other; and (E) if the first and second estimates of the second aircraft parameter are determined to be within the predetermined tolerance range of each other, then determining an actual value of the first aircraft parameter to be approximately equal to the assumed value of the first aircraft parameter, and determining an actual value of the second aircraft parameter from at least one of the first and second estimates of the second aircraft parameter.

17. The air data system of claim 16, and if the first and second estimates of the second aircraft parameter are determined to not be within the predetermined tolerance range of each other, then the air data computer is configured to iteratively determine the first and second air data parameters for the aircraft by further performing the steps (F) defining an assumed value of the second aircraft parameter to be an average of the first and second estimates of the second aircraft parameter;

(G) calculating a first estimate of the first aircraft parameter as a function of the assumed value of the second aircraft parameter and of the first local angle of attack value;

(H) calculating a second estimate of the first aircraft parameter as a function of the assumed value of the second aircraft parameter and of the second local angle of attack value;

(I) comparing the first and second estimates of the first aircraft parameter to determine whether they are within a predetermined tolerance range of each other; and (J) if the first and second estimates of the first aircraft parameter are determined to be within the predetermined tolerance range of each other, then determining the actual value of the second aircraft parameter to be approximately equal to the assumed value of the second aircraft parameter, and determining the actual value of the first aircraft parameter from at least one of the first and second estimates of the first aircraft parameter.

18. The air data system of claim 17, wherein if the first and second estimates of the first aircraft parameter are determined to not be within the predetermined tolerance range of each other, then the air data computer is configured to determine the first and second air data parameters for the aircraft by further performing the steps of:

(K) defining the assumed value of the first aircraft parameter to be an average of the first and second estimates of the first aircraft parameter; and (L) repeating steps (B) through (E) using the new assumed value of the first aircraft parameter.

* * * * *